United States Patent [19]

Schultenkamper

[11] 3,770,993

[45] Nov. 6, 1973

[54] SEALING SYSTEM FOR A ROLLER BEARING OR THE LIKE

[75] Inventor: Josef Schultenkamper, Essen, Germany

[73] Assignee: Gelenkwellenbau GmbH, Essen, Germany

[22] Filed: May 3, 1972

[21] Appl. No.: 249,770

[30] Foreign Application Priority Data
May 3, 1971 Germany.................. P 21 21 816.6

[52] U.S. Cl............................... 308/187.2, 277/53
[51] Int. Cl....................... F16c 33/78, F16c 33/80
[58] Field of Search................... 308/187.1, 187.2, 308/36.1, 36.4; 277/53, 58

[56] References Cited
UNITED STATES PATENTS

| | | | |
|---|---|---|---|
| 2,945,730 | 7/1960 | Murray et al. | 308/187.2 |
| 3,679,277 | 7/1972 | Dohmen | 308/187.1 |
| 2,868,574 | 1/1959 | Rich, Jr. | 277/58 |
| 2,622,945 | 12/1952 | Nickle et al. | 308/187.1 |
| 2,819,100 | 1/1958 | Peterson | 308/187.2 |
| 3,550,974 | 12/1970 | Kupchick | 308/187.2 |

Primary Examiner—Charles J. Myhre
Assistant Examiner—Barry Grossman
Attorney—Herbert L. Lerner et al.

[57] ABSTRACT

Sealing system for an antifriction bearing having an inner and an outer bearing race and a ring of rolling members disposed therebetween, includes lip seals respectively disposed adjacent to and on opposite sides of the ring of rolling members, respective labyrinth seals spaced outwardly from the lip seals and sealing the bearing at opposite sides thereof from the outside, a supply of lubricant received in the space between the respective lip seals and labyrinth seals, and respective disc members located adjacent the inner bearing race of the bearing and extending radially outwardly into the spaces wherein the lubricant is received.

5 Claims, 1 Drawing Figure

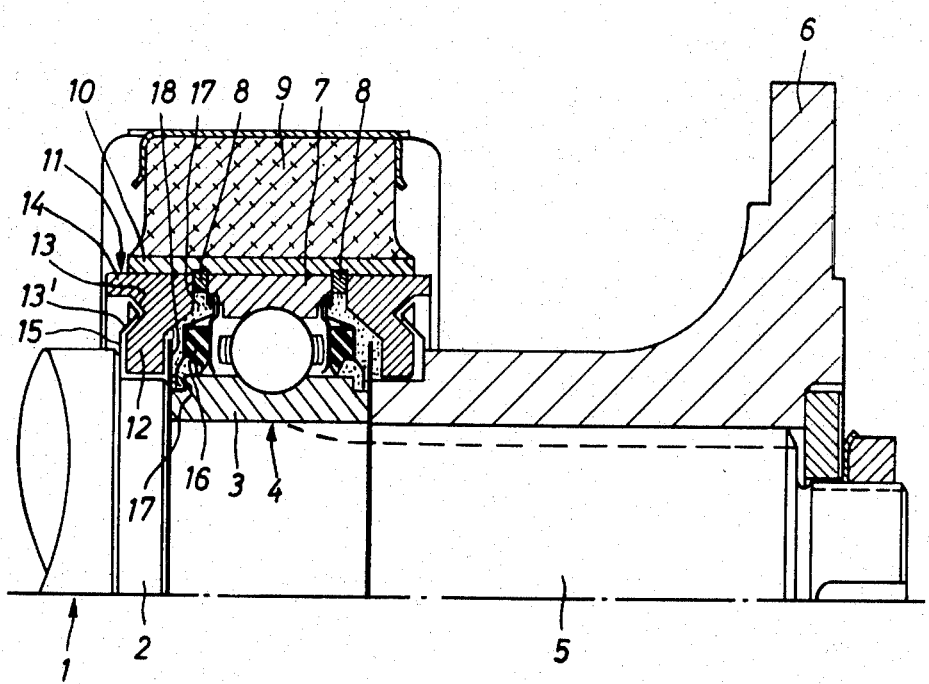

SEALING SYSTEM FOR A ROLLER BEARING OR THE LIKE

The invention relates to a sealing system for an antifriction bearing, such as a roller or ball bearing, or the like, and in particular a bearing for the intermediate shaft of a divided universal shaft system, which includes lips seals respectively disposed adjacent to and on opposite sides of the ring of rolling members of the bearing, respective labyrinth seals for sealing the bearing at opposite sides thereof from the exterior, and a supply of lubrication or grease received on each side of the ring of rolling members in the space between the respective lip seals and labyrinth seals.

A bearing for an intermediate shaft of a divided universal shaft system, which is installed for transmitting power from an anteriorly disposed prime mover to the rear wheels of a vehicle, is often required at present to be constructed so that it is completely maintenance-free. Accordingly, the bearing for the intermediate shaft is therefore required to function without any form of re-lubrication over the entire working life of the universal shaft system. Rolling bearings used for other purposes are also now frequently required to have lifetime sealing systems.

A sealing system having the afore-mentioned features has already been proposed for the bearing of an intermediate shaft, the space within the bearing between the labyrinth seal and the lip seal, which has a sealing lip that bears on the outer periphery surface of the inner bearing race, being filled exclusively with grease, and the sealing members being formed of paralled sheet-metal discs which extend substantially radially, in particular with the free ends thereof. When these heretofore known sealing systems are in operation, dust and water can penetrate through the gaps of the labyrinth seal and through an annular gap which forms at the radially inner side of the supply of grease due to the action of centrifugal force as the shaft rotates so that the bearing raceways are ultimately ruined thereby.

It is accordingly an object of the invention to provide a sealing system for an antifriction bearing which avoids the foregoing disadvantages of the heretofore known sealing systems of this general type.

A further object of the invention is to provide a sealing system for an antifriction bearing which, aside from the superior functioning thereof with respect to heretofore known sealing systems of this general type, also affords the advantage of low production costs when considering the accurate and painstaking construction of the labyrinth seal.

With the foregoing and other objects in view, there is provided in accordance with the invention, sealing system for an antifriction bearing, especially for an intermediate shaft of a divided universal shaft system, sealing system for an antifriction bearing having an inner and an outer bearing race and a ring of rolling members disposed therebetween, comprising lip seals respectively disposed adjacent to and on opposite sides of the ring of rolling members, respective labyrinth seals spaced outwardly from the lip seals and sealing the bearing at opposite sides thereof from the outside, a supply of lubricant received in the space between the respective lip seals and labyrinth seals, and respective disc members located adjacent the inner bearing race of the bearing and extending radially outwardly into the spaces wherein the lubricant is received.

The disc associated with the inner bearing race separates the supply of lubrication or grease with the exception of a radially outer gap located between the disc and the boss or the inner seal member of the labyrinth seal. Accordingly, if the grease is thrust radially outwardly due to the effect of centrifugal force during operation of the bearing, and a cavity forms radially inwardly, particles which might otherwide penetrate into the cavity thus formed cannot reach the bearing but are retained instead by the disc which is associated with the inner bearing race. Since the disc is always surrounded radially outwardly by grease even at high rotary speed, foreign particles cannot pass the disc radially. The sealing system of the invention which is thus improved over corresponding heretofore known sealing systems thus affords absolute protection against the penetration of foreign particles over the entire working life of the bearing.

In accordance with another feature of the invention, each labyrinth seal includes an axially inner member which is stationary with respect to a boss annularly surrounding the bearing, the inner labyrinth seal member being a ring formed of plastic material and received in the bore of the annular boss, the inner labyrinth seal ring being formed with a circular recess in the axially outer end face thereof, the labyrinth seal also including an axially outer member rotatable together with the shaft and having a deformation at a radially outer end portion thereof having a profile extending substantially parallel to the recess.

In accordance with a further feature of the invention, the recess and the end portion have a V-shaped cross section or profile, the outer leg of the V being directed both radially and axially outwardly.

In accordance with yet another feature of the invention, the radially outer end of the axially inner member of the labyrinth seal has an axially outwardly extending collar which radially and axially covers the axially outer member of the labyrinth seal. Due to this construction of the labyrinth seal any penetration by foreign particles, such as water or the like, into the lubrication-supplied space is rendered virtually impossible from the very outset; the construction of members of the labyrinth seal provides an especially long angular gap which ensures particularly effective throw-off of dirt and water because of the shape of the seal member parts in the radially outer portion of the labyrinth seal. The collar on the axially inner seal member covering the axially outer seal member provides additional protection.

Other features which are considered as characteristic for the invention are set forth in the appended claims.

Although the invention is illustrated and described herein as embodied in sealing system for a roller bearing or the like, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing showing half of an axial diametrical section of the bearing for an intermediate shaft provided with a sealing system for the bearing, the half of the section omitted from the drawing being a mirror image of the illustrated half.

Referring now to the drawing, there is shown therein an intermediate shaft 1 provided with a shoulder 2 against which the inner race 3 of a grooved ball-bearing, generally identified by reference numeral 4, is stressed by a flange 6 which has been slid onto the shaft end 5. The outer race 7 of the grooved ball-bearing 4 is limited against displacement in axial direction by two circlips 8 disposed in the boss 10. The boss 10 is formed of a sheet-metal ring which supports an intermediate ring 9 formed of elastic rubber. The rubber intermediate ring 9 is secured to the vehicle frame at the outside thereof by means of a non-illustrated mounting bracket and retaining plate.

The sealing system of the grooved ball-bearing 4 is symmetrically constructed on both axial sides thereof so that it is necessary to describe only one side thereof. The grooved ball-bearing 4 is sealed against the outside by a labyrinth seal identified generally by the reference numeral 11. The labyrinth seal 11 includes a stationary and axially inner seal member 12 in the form of a ring of suitable plastic material having an outer peripheral surface engaging the inner peripheral surface of the sheetmetal ring 10, and pushed against the circlip 8. At the axially outer end face of the ring 12 there is provided a V-shaped annular groove 13. On the same end face but further outward radially, the ring 12 of plastic material is provided with an axially extending collar 14. The axially outer seal member of the labyrinth seal 11 is formed of a sheet-metal ring 15, so constructed as to extend parallel to the outer axial end face of the ring 12 and having a radially outer portion that is therefore provided with a deformation 13' of V-shaped cross section which extends into the correspondingly shaped groove 13. Because of this construction, the annular gap between the ring 12 of plastic material and the sheetmetal ring 15 is relatively long, and the radially outer end thereof extends outwardly at an angle away from the bearing 4.

A lip seal 16, mounted on the outer race 7 and having a lip which bears on the outer peripheral surface of the inner bearing race 3 and is directed axially away from the ring of rolling members of the grooved ball bearing 4, is disposed adjacent to the ring of rolling members. The space 17 between the labyrinth seal 11 and the lip seal 16 contains a lubricant such as grease and is divided by a respective thin radially extending disc 18 which is clamped between one of the end faces of the inner race 3 and the shoulder 2 of the shaft 1, on the one hand and the other of the end faces of the inner race 3 and the flange 6, on the other hand. The disc 18 does not extend entirely against the ring 12 of plastic material, which is provided with a chamber in this region, but leaves a gap between the radially outer end thereof and the ring 12 to permit free distribution of the grease supply in the space 17 which is subdivided by the disc 18.

In operation the grease disposed in the space 17 is forced radially outwardly by centrifugal force so that a radially inner gap is formed within the space 17, which is sealed, however, by the disc 17. The radial dimension of the gap which is thus formed is smaller than the radial dimension of that part of the disc 18 which extends freely into the space 17; the radially outer end of the disc 18 is therefore always surrounded by grease so that no foreign particles are able to pass through the space 17 at the disc 18 so as to reach the surfaces of the bearing races. Due to centrifugal action within the gap between the members 13 and 13' of the labyrinth seal 11, which gap extends axially and outwardly at an angle, ingress of such foreign particles into the space 17 is also prevented.

I claim:

1. In an antifriction bearing having an inner and an outer bearing race and a ring of rolling members disposed therebetween, a sealing system comprising lip seals respectively disposed adjacent to and on opposite sides of the ring of rolling members, respective labyrinth seals spaced outwardly from said lip seals and sealing the bearing at opposite sides thereof from the outside, a supply of lubricant received in the space between the respective lip seals and labyrinth seals, and respective disc members located adjacent the inner bearing race of the bearing and extending radially outwardly into the spaces wherein said lubricant is received.

2. Sealing system according to claim 1 wherein said lubricant is grease.

3. Sealing system according to claim 2 wherein a boss peripherally surrounds the antifriction bearing, and said labyrinth seal comprises an axially inner member in the form of a ring of plastic material received in the bore of said boss and fixed to said boss, said ring of plastic material having an axially outer end face formed with a circular recess, and an axially outer member rotatable with a shaft on which the antifriction bearing is mountable, the axially outer member having a deformation at a radially outer end portion thereof, said deformation extending into said recess and having a profile extending substantially parallel to the defining surfaces of said recess.

4. Sealing system according to claim 3 wherein said recess and said radially outer end portion have a V-shaped cross section, the outer leg of the V being directed both radially and axially outwardly.

5. Sealing system according to claim 4 wherein the radially outer end of said axially inner member of said labyrinth seal has an axially outwardly extending collar radially and axially covering said axially outer member of said labyrinth seal.

* * * * *